(12) United States Patent
Lim et al.

(10) Patent No.: US 9,455,438 B2
(45) Date of Patent: Sep. 27, 2016

(54) METHOD FOR PREPARING ELECTRODE MIX AND THE ELECTRODE MIX PREPARED BY USING THE SAME

(71) Applicant: LG CHEM, LTD., Seoul (KR)

(72) Inventors: SooHyun Lim, Daejeon (KR); Jihyun Kim, Daejeon (KR); Tae Jin Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 261 days.

(21) Appl. No.: 13/862,132

(22) Filed: Apr. 12, 2013

(65) Prior Publication Data

US 2013/0295455 A1    Nov. 7, 2013

(30) Foreign Application Priority Data

Apr. 13, 2012    (KR) ........................ 10-2012-0038575

(51) Int. Cl.
| | | |
|---|---|---|
| *H01M 4/13* | (2010.01) | |
| *H01M 4/02* | (2006.01) | |
| *H01M 4/58* | (2010.01) | |
| *H01M 4/62* | (2006.01) | |
| *H01M 4/131* | (2010.01) | |
| *H01M 4/1391* | (2010.01) | |
| *H01M 4/505* | (2010.01) | |

(52) U.S. Cl.
CPC ........... *H01M 4/131* (2013.01); *H01M 4/1391* (2013.01); *H01M 4/505* (2013.01); *H01M 2004/021* (2013.01); *Y02E 60/122* (2013.01); *Y02P 70/54* (2015.11)

(58) Field of Classification Search
USPC ........ 29/623.5, 623.1; 429/231.95, 209, 217, 429/232
See application file for complete search history.

(56) References Cited

U.S. PATENT DOCUMENTS

| | | | |
|---|---|---|---|
| 4,444,852 A * | 4/1984 | Liu et al. | ...................... 429/406 |
| 2010/0009257 A1 | 1/2010 | Kang et al. | |
| 2013/0189578 A1 | 7/2013 | Oh et al. | |

FOREIGN PATENT DOCUMENTS

| | | |
|---|---|---|
| JP | 2001-210324 A | 8/2001 |
| JP | 2009-526349 A | 7/2009 |
| KR | 2009-0020882 A | 2/2009 |
| KR | 2012-0030951 A | 3/2012 |

\* cited by examiner

*Primary Examiner* — Patrick Ryan
*Assistant Examiner* — Julian Anthony
(74) *Attorney, Agent, or Firm* — Birch, Stewart, Kolasch & Birch, LLP

(57) ABSTRACT

Disclosed are a method for preparing an electrode mix comprising (i) adding an electrode active material, a conductive material and a binder to a solvent, (ii) further adding a surfactant to the mixture of step (i), and (iii) mixing the resulting mixture of step (ii) and an electrode mix for secondary batteries prepared by the method.

6 Claims, 1 Drawing Sheet

METHOD FOR PREPARING ELECTRODE MIX AND THE ELECTRODE MIX PREPARED BY USING THE SAME

TECHNICAL FIELD

The present invention relates to a method for preparing an electrode mix. More specifically, the present invention relates to a method for preparing an electrode mix for a secondary battery, comprising (i) adding an electrode active material, a conductive material and a binder to a solvent, (ii) further adding a surfactant to the mixture of step (i), and (iii) mixing the resulting mixture of step (ii).

BACKGROUND ART

Technological development and increased demand for mobile equipment have led to a sharp rise in the demand for secondary batteries as energy sources. Among these secondary batteries, lithium secondary batteries having high energy density and driving voltage, long cycle lifespan and low self-discharge are commercially available and widely used.

In addition, increased interest in environmental issues has brought about a great deal of research associated with electric vehicles (EVs) and hybrid electric vehicles (HEVs) as alternatives to vehicles using fossil fuels such as gasoline vehicles and diesel vehicles which are major causes of air pollution. Nickel-metal hydride (Ni-MH) secondary batteries are generally used as power sources of electric vehicles (EVs) and hybrid electric vehicles (HEVs). However, a great deal of study associated with use of lithium secondary batteries with high energy density, high discharge voltage and power stability is currently underway and some of such lithium secondary batteries are commercially available.

A lithium secondary battery has a structure in which a non-aqueous electrolyte comprising a lithium salt is impregnated into an electrode assembly comprising a cathode and an anode, each comprising an active material coated onto a current collector, and a porous separator interposed therebetween.

In general, a method including applying a slurry-type electrode mix to an electrode current collector, followed by drying and pressing is used for production of an electrode for secondary batteries. In addition, an electrode active material, a conductive material and a binder are added to a solvent, followed by homogeneously mixing in order to prepare the slurry-type electrode mix.

In this process, the electrode active material or the like may be used in the form of considerably small particles. In this case, fine particles agglomerate, thus disadvantageously inhibiting homogenization. In order to solve this problem, mixing time may be lengthened. However, disadvantageously, this mixing time serves as a bottleneck in the overall process.

Accordingly, there is an increasing need for methods capable of homogeneously mixing fine particles.

DISCLOSURE

Technical Problem

Therefore, the present invention has been made to solve the above and other technical problems that have yet to be resolved.

As a result of a variety of extensive and intensive studies and experiments to solve the problems as described above, the present inventors discovered that desired effects can be obtained by adding a surfactant to a mixture for an electrode mix, as described later. The present invention has been completed based on this discovery.

Technical Solution

In accordance with one aspect of the present invention, provided is a method for preparing an electrode mix, comprising: (i) adding an electrode active material, a conductive material and a binder to a solvent; (ii) further adding a surfactant to the mixture of step (i); and (iii) mixing the resulting mixture of step (ii).

In general, the electrode mix is provided as a slurry obtained by adding an electrode active material, a conductive material, a binder and the like to an organic solvent.

A surface area of the electrode active material increases and electrochemical performance thereof is thus improved as a particle size thereof decreases. On the other hand, as a particle size of the electrode active material decreases, agglomeration occurs and homogeneous mixing is thus difficult. Accordingly, although fine particles are used as the electrode active material, by adding a surfactant thereto, homogeneous mixing is possible within a relatively short time and processability and battery performance can be improved.

In an embodiment, the electrode active material may have a mean particle diameter of 30 µm or less. The electrode active material having a mean particle diameter of 30 µm provides suitable processability without addition of a surfactant during mixing. In addition, for this reason, the electrode active material may have a surface area of 1 $m^2/g$ or higher.

Any solvent may be used without particular limitation so long as it is capable of mixing solids to provide a slurry. For example, the solvent may be a polar or non-polar solvent.

Any surfactant may be used so long as it is capable of enhancing dispersibility in the electrode mix mixture. For example, the surfactant is at least one selected from the group consisting of an anionic surfactant, a cationic surfactant and a nonionic surfactant.

In a preferred embodiment, when the solvent is a polar solvent, the surfactant may be an anionic surfactant and/or a cationic surfactant, and when the solvent is a non-polar solvent, the surfactant may be a nonionic surfactant.

The present invention provides an electrode mix for secondary batteries prepared by the method and an electrode for secondary batteries produced by applying the electrode mix to an electrode current collector.

The electrode for secondary batteries may be a cathode comprising a cathode active material or an anode comprising an anode active material.

For example, the cathode for secondary batteries is prepared by applying a mixture containing a cathode active material, a conductive material and a binder to a cathode current collector, followed by drying and pressing, and further optionally comprises a filler.

The cathode current collector is generally manufactured to have a thickness of 3 to 500 µm. Any cathode current collector may be used without particular limitation so long as it has suitable conductivity without causing adverse chemical changes in the fabricated battery. Examples of the cathode current collector include stainless steel, aluminum, nickel, titanium, sintered carbon, and aluminum or stainless steel surface-treated with carbon, nickel, titanium or silver. The cathode current collectors include fine irregularities on the surfaces thereof so as to enhance adhesion to the cathode active material. In addition, the cathode current collector may be used in various forms including films, sheets, foils, nets, porous structures, foams and non-woven fabrics.

Examples of the cathode current collector include, but are not limited to, layered compounds such as lithium cobalt oxide ($LiCoO_2$) and lithium nickel oxide ($LiNiO_2$) or these compounds substituted by one or more transition metals; lithium nickel manganese cobalt composite oxides with a layered structure represented by $LiNi_xMn_yCo_zO_2$; lithium manganese oxides represented by $Li_{1+x}Mn_{2-x}O_4$ (in which $0 \le x \le 0.33$), $LiMnO_3$, $LiMn_2O_3$ and $LiMnO_2$; lithium copper oxide ($Li_2CuO_2$); vanadium oxides such as $LiV_3O_8$, $LiFe_3O_4$, $V_2O_5$ and $Cu_2V_2O_7$; Ni-site type lithiated nickel oxides represented by $LiNi_{1-x}M_xO_2$ (M=Co, Mn, Al, Cu, Fe, Mg, B or Ga, and $0.01 \le x \le 0.3$); lithium manganese composite oxides represented by $LiMn_{2-x}M_xO_2$ (M=Co, Ni, Fe, Cr, Zn or Ta, and $0.01 \le x \le 0.1$), or $Li_2Mn_3MO_8$ (M=Fe, Co, Ni, Cu or Zn); $LiMn_2O_4$ wherein Li is partially substituted by alkaline earth metal ions; disulfide compounds; and $Fe_2(MoO_4)_3$.

In one embodiment, the cathode active material may comprise lithium manganese composite oxide with a spinel structure represented by the following Formula 1:

$$Li_xM_yMn_{2-y}O_{4-z}A_z \quad (1)$$

wherein $0.9 \le x \le 1.2$, $0 < y < 2$ and $0 \le z < 0.2$;

M is at least one element selected from the group consisting of Al, Mg, Ni, Co,

Fe, Cr, V, Ti, Cu, B, Ca, Zn, Zr, Nb, Mo, Sr, Sb, W, Ti and Bi; and

A is at least one negative univalent or bivalent anion.

Specifically, the lithium manganese composite oxide may be lithium nickel manganese oxide represented by the following Formula 2:

$$Li_xNi_yMn_{2-y}O_4 \quad (2)$$

wherein $0.9 \le x \le 1.2$, and $0.4 \le y \le 0.5$.

More specifically, the lithium nickel manganese oxide may be $LiNi_{0.5}Mn_{1.5}O_4$ or $LiNi_{0.4}Mn_{1.6}O_4$.

The conductive material is commonly added in an amount of 1 to 50% by weight, based on the total weight of the mixture comprising the cathode active material. Any conductive material may be used without particular limitation so long as it has suitable conductivity without causing adverse chemical changes in the battery. Examples of conductive materials include graphite such as natural graphite or artificial graphite; carbon black such as carbon black, acetylene black, Ketjen black, channel black, furnace black, lamp black and thermal black; conductive fibers such as carbon fibers and metallic fibers; metallic powders such as carbon fluoride powders, aluminum powders and nickel powders; conductive whiskers such as zinc oxide and potassium titanate; conductive metal oxides such as titanium oxide; and conductive materials such as polyphenylene derivatives.

The binder is a component which enhances binding of an electrode active material to the conductive material and the current collector. The binder is commonly added in an amount of 1 to 50% by weight, based on the total weight of the mixture comprising the cathode active material. Examples of the binder include polyvinylidene fluoride, polyvinyl alcohol, carboxymethylcellulose (CMC), starch, hydroxypropylcellulose, regenerated cellulose, polyvinyl pyrrolidone, tetrafluoroethylene, polyethylene, polypropylene, ethylene propylene diene terpolymer (EPDM), sulfonated EPDM, styrene butadiene rubbers, fluororubbers and various copolymers.

The filler is a component optionally used to inhibit expansion of the electrode. Any filler may be used without particular limitation so long as it does not cause adverse chemical changes in the manufactured battery and is a fibrous material. Examples of the filler include olefin polymers such as polyethylene and polypropylene; and fibrous materials such as glass fibers and carbon fibers.

Meanwhile, the anode is prepared by applying an anode active material to an anode current collector, followed by drying and pressing. The anode active material may comprise a conductive material, a binder, a filler and the like, if necessary.

The anode current collector is generally fabricated to have a thickness of 3 to 500 μm. There is no particular limit as to the anode current collector, so long as it has suitable conductivity without causing adverse chemical changes in the fabricated battery. Examples of the anode current collector include copper, stainless steel, aluminum, nickel, titanium, sintered carbon, and copper or stainless steel surface-treated with carbon, nickel, titanium or silver, and aluminum-cadmium alloys. Similar to the cathode current collector, if necessary, the anode current collector may be processed to form fine irregularities on the surface thereof so as to enhance adhesion to the anode active materials. In addition, the current collectors may be used in various forms including films, sheets, foils, nets, porous structures, foams and non-woven fabrics.

Examples of the anode active materials that can be used in the present invention include carbon such as non-graphitized carbon and graphitized carbon; metal composite oxides such as $Li_xFe_2O_3$ ($0 \le x \le 1$), $Li_xWO_2$ ($0 \le x \le 1$) and $Sn_xMe_{1-x}Me'_yO_z$ (Me: Mn, Fe, Pb, Ge; Me': Al, B, P, Si, Group I, II and III elements of the Periodic Table, halogen atoms; $0 < x \le 1$; $1 \le y \le 3$; and $1 \le z \le 8$); a lithium metal; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni based materials.

In one embodiment, corresponding to the lithium nickel manganese oxide as the high-voltage cathode active material, the anode active material may comprise lithium metal oxide represented by Formula 3 as an anode active material:

$$Li_aM'_bO_{4-c}A_c \quad (3)$$

wherein

M' is at least one element selected from the group consisting of Ti, Sn, Cu, Pb, Sb, Zn, Fe, In, Al and Zr;

a and b are determined depending on an oxidation number of M' within ranges of $0.1 \le a \le 4$ and $0.2 \le b \le 4$;

c is determined depending on an oxidation number within a range of $0 \le c < 0.2$; and A is at least one negative univalent or bivalent anion.

In one embodiment, the lithium metal oxide of Formula 3 may be lithium titanium oxide (LTO) represented by Formula 4 and specific examples thereof include $Li_{0.8}Ti_{2.2}O_4$, $Li_{2.67}T_{1.33}O_4$, $LiTi_2O_4$, $Li_{1.33}Ti_{1.67}O_4$, $Li_{1.14}Ti_{1.71}O_4$ and the like. There is no limitation as to the composition and type of lithium metal oxide so long as it is capable of intercalating and deintercalating lithium ions. More specifically, during charge and discharge, $Li_{1.33}Ti_{1.67}O_4$ or $LiTi_2O_4$ having a spinel structure which does not undergo crystal structure change and is highly reversible may be used.

$$Li_aTi_bO_4 \quad (4)$$

wherein $0.5 \le a \le 3$, and $1 \le b \le 2.5$.

The present invention provides a lithium secondary battery having a structure in which a lithium salt-containing electrolyte is impregnated in an electrode assembly having a structure in which a separator is interposed between the cathode and the anode.

The separator is interposed between the cathode and the anode. As the separator, an insulating thin film having high ion permeability and mechanical strength is used. The separator typically has a pore diameter of 0.01 to 10 μm and a thickness of 5 to 300 μm. As the separator, sheets or non-woven fabrics made of an olefin polymer such as polypropylene and/or glass fibers or polyethylene, which have chemical resistance and hydrophobicity, are used. When a solid electrolyte such as a polymer is employed as the electrolyte, the solid electrolyte may also serve as both the separator and the electrolyte.

The lithium salt-containing non-aqueous electrolyte is composed of a non-aqueous electrolyte and lithium. Examples of the electrolyte include, but are not limited to, non-aqueous organic solvents, organic solid electrolytes, and inorganic solid electrolytes.

Examples of the non-protic organic solvents include N-methyl-2-pyrollidinone, propylene carbonate, ethylene carbonate, butylene carbonate, dimethyl carbonate, diethyl carbonate, ethylmethyl carbonate, gamma-butyrolactone, 1,2-dimethoxy ethane, 1,2-diethoxy ethane, tetrahydrofuran, 2-methyl tetrahydrofuran, dimethylsulfoxide, 1,3-dioxolane, 4-methyl-1,3-dioxene, diethylether, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ethers, methyl propionate and ethyl propionate.

Examples of the organic solid electrolytes include polyethylene derivatives, polyethylene oxide derivatives, polypropylene oxide derivatives, phosphoric acid ester polymers, poly agitation lysine, polyester sulfide, polyvinyl alcohol, polyvinylidene fluoride, and polymers containing ionic dissociation groups.

Examples of the inorganic solid electrolytes include nitrides, halides and sulphates of lithium such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$ and $Li_3PO_4$—$Li_2S$—$SiS_2$.

The lithium salt is a material that is readily soluble in the above-mentioned non-aqueous electrolyte and may include, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $LiSCN$, $LiC(CF_3SO_2)_3$, $(CF_3SO_2)_2NLi$, chloroborane lithium, lower aliphatic carboxylic acid lithium, lithium tetraphenyl borate and imide.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further include halogen-containing solvents such as carbon tetrachloride and ethylene trifluoride. Further, in order to improve high-temperature storage characteristics, the non-aqueous electrolyte may additionally include carbon dioxide gas and may further contain fluoro-ethylene carbonate (FEC), propene sultone (PRS) and the like.

In a preferred embodiment, the lithium salt-containing non-aqueous electrolyte can be prepared by adding a lithium salt such as $LiPF_6$, $LiClO_4$, $LiBF_4$, $LiN(SO_2CF_3)_2$, to a mixed solvent of a cyclic carbonate such as EC or PC as a highly dielectric solvent and linear carbonate such as DEC, DMC or EMC as a low-viscosity solvent.

The present invention provides a battery module comprising the secondary battery as a unit cell and a battery pack comprising the battery module.

The battery pack may be used as a power source of a device requiring high-temperature stability, long cycle properties and high rate properties.

Preferably, examples of the device include, but are not limited to, power tools powered by battery-driven motors; electric vehicles including electric vehicles (EVs), hybrid electric vehicles (HEVs) and plug-in hybrid electric vehicles (PHEVs); electric two-wheeled vehicles including electric bikes (E-bikes) and electric scooters (E-scooters); electric golf carts; power storage systems and the like.

Effects of the Invention

As apparent from the fore-going, a method for preparing an electrode mix for secondary batteries according to the present invention uses a surfactant, thereby advantageously enhancing dispersability of a mixture for the electrode mix and improving homogeneity of the electrode mix.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
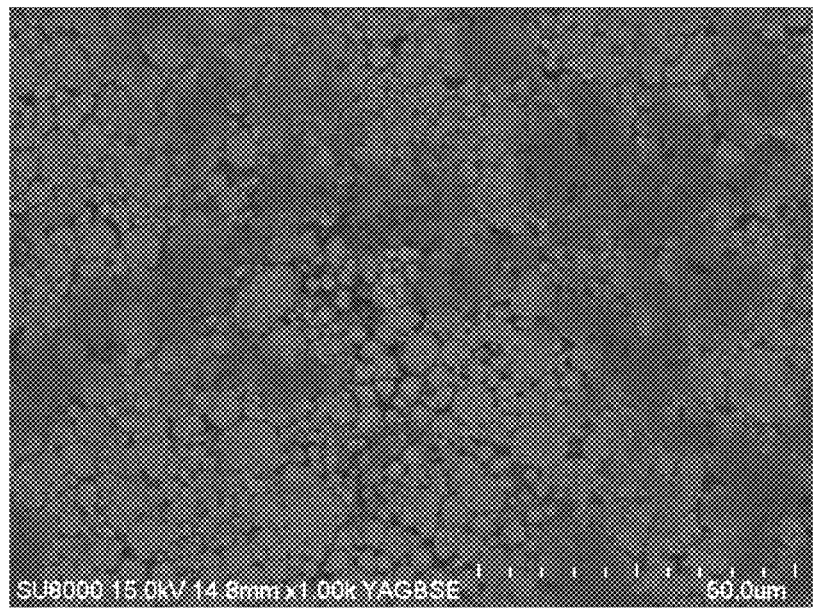
FIG. 1 is an enlarged image showing an anode surface according to Comparative Example 1.

Now, the present invention will be described in more detail with reference to the following examples. These examples are provided only to illustrate the present invention and should not be construed as limiting the scope and spirit of the present invention.

EXAMPLE 1

90% by weight of $LiNi_{0.5}Mn_{1.5}O_4$ having a mean particle diameter of 1.4 μm and a surface area of 0.6 $m^2/g$ as a cathode active material, 4.5% by weight of Super-P (conductive material), 5% by weight of PVdF (binder) and 0.5% by weight of Pluronic™ F127 (BASF product) as a surfactant were added to N-methyl-2-pyrrolidone (NMP) as a solvent to prepare a slurry, and the slurry was coated onto an aluminum foil with a thickness of 20 μm, followed by drying and pressing, to produce a cathode.

Titanium isopropoxide was mixed with lithium hydroxide, followed by baking at a high temperature to prepare $Li_{4/3}Ti_{5/3}O_4$ having a mean particle diameter of 9.17 μm and a surface area of 3.7 $m^2/g$ as an anode active material, and 90% by weight of the prepared anode active material, 4.5% by weight of Super-P (conductive material), 5% by weight of PVdF (binder) and 0.5% by weight of Pluronic™ F127 (BASF product) as a surfactant were added to NMP, to prepare an anode mixture slurry. The slurry was coated onto an aluminum foil with a thickness of 20 μm, followed by drying and pressing, to produce an anode.

The cathode and the anode were laminated using Celgard™ as a separator to produce a battery assembly, and a lithium non-aqueous electrolyte consisting of ethyl carbonate, dimethyl carbonate and ethyl methyl carbonate at a volume ratio of 1:1:1 and containing 1M $LiPF_6$ as a lithium salt was added to the electrode assembly to produce a lithium secondary battery.

EXAMPLE 2

A lithium secondary battery was produced in the same manner as in Example 1, except that 90% by weight of $Li_{4/3}Ti_{5/3}O_4$ as an anode active material, 4.5% by weight of Super-P (conductive material) and 5% by weight of PVdF (binder) were added to NMP to prepare an anode mixture slurry and the slurry was coated onto an aluminum foil with a thickness of 20 μm, followed by drying and pressing, to produce an anode.

EXAMPLE 3

A lithium secondary battery was produced in the same manner as in Example 1, except that 90% by weight of $LiNi_{0.5}Mn_{1.5}O_4$ as an anode active material, 5% by weight of Super-P (conductive material) and 5% by weight of PVdF (binder) were added to NMP to prepare an anode mixture slurry and the slurry was coated onto an aluminum foil with a thickness of 20 μm, followed by drying and pressing, to produce an anode.

COMPARATIVE EXAMPLE 1

A lithium secondary battery was produced in the same manner as in Example 1, except that 90% by weight of $LiNi_{0.5}Mn_{1.5}O_4$ having a mean particle diameter of 1.4 μm and a surface area of 0.6 $m^2/g$ as a cathode active material, 5% by weight of Super-P (conductive material) and 5% by weight of PVdF (binder) were added to N-methyl-2-pyrrolidone (NMP) as a solvent to prepare a slurry and the slurry was coated onto an aluminum foil with a thickness of 20 μm, followed by drying and pressing, to produce a cathode.

90% by weight of $Li_{4/3}Ti_{5/3}O_4$ having a mean particle diameter of 9.17 μm and a surface area of 3.7 $m^2/g$ as an anode active material, 5% by weight of Super-P (conductive material) and 5% by weight of PVdF (binder) were added to NMP to prepare an anode mixture slurry and the slurry was coated onto an aluminum foil with a thickness of 20 μm, followed by drying and pressing, to produce an anode.

The cathode and the anode were laminated using Celgard™ as a separator to produce a battery assembly, and a lithium non-aqueous electrolyte containing 1M $LiPF_6$ as a lithium salt was added to the electrode assembly to produce a lithium secondary battery.

EXPERIMENTAL EXAMPLE 1

Rate and cycle characteristics of lithium secondary batteries produced in Examples 1 to 3 and Comparative Example 1 were tested. Results are shown in Table 1 below.

TABLE 1

| | Surfactant | Application | | Battery characteristics | |
| | | | | Rate | 50 cycle capacity |
| | F127 | Cathode | Anode | (1 C/3 C) | maintenance (%) |
|---|---|---|---|---|---|
| Ex. 1 | ○ | ○ | ○ | 92.3% | 87.7% |
| Ex. 2 | ○ | ○ | — | 87.6% | 86.9% |
| Ex. 3 | ○ | — | ○ | 89.1% | 86.2% |
| Comp. Ex. 1 | — | — | — | 83.6% | 83.5% |

As can be seen from Table 1, the batteries of Example 1 to 3 according to the present invention exhibited superior rate and cycle characteristics, as compared to the battery of Comparative Example 1. In particular, it could be seen that $50^{th}$ cycle properties was considerably improved. This means that uniform mixing is possible and performance of the battery can be ultimately improved, although fine particles are used as an electrode active material by adding a surfactant to a mixture for an electrode mix.

EXPERIMENTAL EXAMPLE 2

Figure 2:
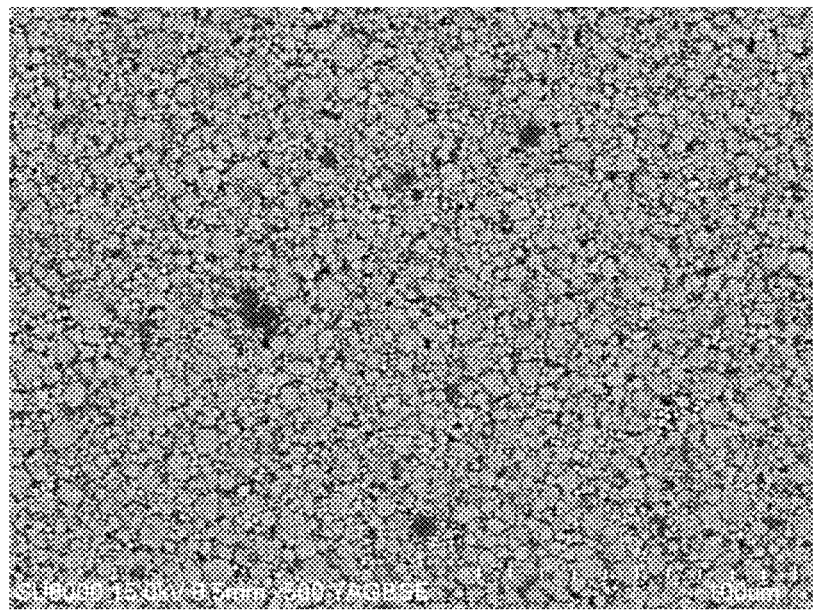
FIG. 2 is an enlarged image showing an anode surface according to Example 1.

An anode surface of secondary batteries produced in Example 1 and Comparative Example 1 was observed using scanning electron microscopy (SEM). Results obtained by SEM are shown in FIGS. 1 and 2. Referring to FIGS. 1 and 2, the gap between anode active material particles on the anode surface of Example 1 was uniform, while anode active material particles agglomerated on the electrode surface of Comparative Example 1.

EXPERIMENTAL EXAMPLE 3

In the process of preparing cathode and anode slurries of Example 1 and Comparative Example 1, the cathode and anode slurries were mixed in a paste mixer at a rate of 1,500 rpm and a time required to obtain a homogeneous slurry was measured. The time is shown in Table 2 below.

TABLE 2

| | Mixing time (min) | |
| | Cathode slurry | Anode slurry |
|---|---|---|
| Ex. 1 | 10 min | 13 min |
| Comp. Ex. 1 | 15 min | 20 min |

As can be seen from Table 2 above, the cathode and anode slurries of Example 1 according to the present invention exhibited a decrease in time required for obtaining the homogeneous slurry, as compared to the cathode and anode slurries of Comparative Example 1. This means that the time for producing the battery can be reduced by adding a surfactant to the mixture for the electrode mix.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method for preparing a lithium secondary battery, comprising:
(a) preparing an anode for the lithium secondary battery by:
(a-i) adding an anode active material for a lithium secondary battery, which has a mean particle diameter of 30 μm or less, a conductive material and a binder to a solvent to form a mixture, wherein said anode active material comprises lithium titanium oxide (LTO) represented by Formula 4:

$$Li_aTi_bO_4 \quad (4)$$

wherein $0.5<a<3$ and $1<b<2.5$;
(a-ii) further adding a surfactant to the mixture of step (a-i);
(a-iii) mixing the resulting mixture of step (a-ii) to obtain an anode mix; and
(a-iv) applying the anode mix obtained in step (a-iii) to an anode current collector;
(b) preparing a cathode for the lithium secondary battery by:
(b-i) adding a cathode active material for a lithium secondary battery, which has a mean particle diameter of 30 μm or less, a conductive material and a binder to a solvent to form a mixture, wherein said cathode active material comprises a lithium nickel manganese oxide with a spinel structure represented by the following Formula 2:

$$Li_xNi_yMn_{2-y}O_4 \quad (2)$$

wherein $0.9<x<1.2$, and $0.4<y<0.5$, and
(b-ii) further adding a surfactant to the mixture of step (b-i);
(b-iii) mixing the resulting mixture of step (b-ii) to obtain a cathode mix; and
(b-iv) applying the cathode mix obtained in step (b-iii) to a cathode current collector; and
(c) preparing the lithium secondary battery with the anode of step (a) and the cathode of step (b).

2. The method according to claim 1, wherein the electrode active material has a surface area of 1 m²/g or more.

3. The method according to claim 1, wherein the solvent is a polar solvent or a non-polar solvent.

4. The method according to claim 3, wherein the solvent is a polar solvent and the surfactant is an anionic surfactant and/or a cationic surfactant.

5. The method according to claim 3, wherein the solvent is a non-polar solvent and the surfactant is a nonionic surfactant.

6. The method according to claim 1, wherein the surfactant is at least one selected from the group consisting of an anionic surfactant, a cationic surfactant and a nonionic surfactant.

* * * * *